April 26, 1960  F. P. SOMOGYI  2,933,796
UTILIZATION OF FLY ASH
Filed Nov. 23, 1956
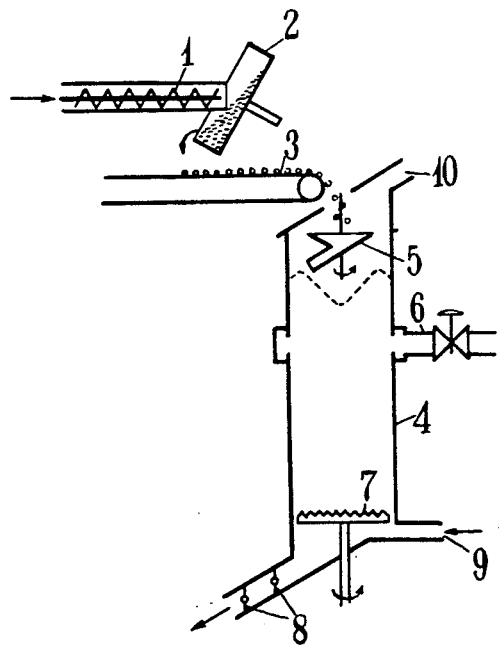

United States Patent Office 2,933,796
Patented Apr. 26, 1960

2,933,796

UTILIZATION OF FLY ASH

Francis Paul Somogyi, London, England

Application November 23, 1956, Serial No. 623,925

Claims priority, application Netherlands May 9, 1956

7 Claims. (Cl. 25—156)

This invention relates to the sintering of powdered material and it has particular relation to the sintering of fly ash or other powdered material containing fuel corresponding to a carbon content of at least 2.5 to 3% carbon or having added thereto fuel, e.g. in a powdered form to bring the fuel content of the powdered material to at least the required level.

Fly ash is the ash residue obtained in furnaces operated with pulverized coal and is available in very large quantities from mechanical and electrostatic precipitators operated in conjunction with such furnaces. The disposal of this fly ash has presented a serious embarrassment and cost to the power stations. Accordingly, it is an object of the present invention to produce at low cost from this fly ash a light-weight aggregate which can be used in the manufacture of building blocks, heat insulation, filters, and other articles requiring a uniform light-weight sintered material of high strength and/or good insulating qualities and minimum moisture content.

Fly ash, depending on the operating conditions of the furnaces and the quality of the coal used, contains usually solid fuel corresponding to a carbon content of between 3 and 18% by weight.

While some light-weight aggregates made from fly ash have been known and prepared in rotary kilns and sinter grates, these devices have certain disadvantages one of which is the need for extra fuel required for continuous ignition, and, in some cases, for the maintenance of combustion, in addition to the fuel originally present in the starting material which is required for the maintenance of combustion; the total fuel requirements being equivalent to about 8 to 10% carbon.

The present invention relates to a process for sintering powders of the above-mentioned type, in which the fly ash or other powdered material is first pre-formed into convenient shapes for combustion and is then caused to pass downward preferably in vertical direction through a combustion space, e.g. a vertical shaft sintering furnace or kiln in which combustion of the fuel ingredients and sintering of the material takes place at a desired closely controlled sintering temperature, whereupon the sintered material is cooled and removed from the furnace.

By carrying out the process of the invention in the above-described manner, the process is maintained solely by the exothermic reaction of the combustible material present in the fly ash, or other similar material, so that a great economy in fuel is achieved and no extra fuel, in addition to the fuel originally present in the starting material, is required for the continuous maintenance of the process of this invention. Furthermore, the use of a closely controlled sintering temperature has the advantage described hereinafter.

The appended drawing is a diagrammatical section illustrating by way of example and without limitation, an arrangement for carrying out the process of the invention.

Referring now to the drawing in detail, the fly ash, or similar material, is passed through a paddle mixer (not shown) where a small amount of water for dust prevention purposes is added. Sometimes it is advisable to add small amounts of other material such as cinder, sawdust, or returns, which may be desirable to control the calorific value and the porosity of the material passing through the furnace. From the paddle mixer the material is delivered, e.g. by delivery screw 1 to an inclined-table nodulizer 2, the inclination of the axis of which is adjustable within at least plus or minus 8 degrees of a mean position of approximately 30 degrees. Alternatively, the material to be treated can be delivered directly to the table nodulizer 2.

The table nodulizer 2 consists of a plate of from 6 to 20 feet in diameter, according to output, and has a rim inclined at right angles or at some other angle to the plate. The material is then sprayed with water by means not shown, and due to the rotating movement forms itself into nodules of approximately spherical shape. The larger nodules tumble forward and produce an overflow of shaped particles or nodules of near uniform size, the dimensions of which are controlled by the angular setting of the nodulizer, its speed and the moisture content, as well as the positions of the feed and spray.

The use of such nodulizer has the advantage that its construction is relatively inexpensive and that it automatically segregates the nodule size found most advantageous for the purposes of the invention. However, nodulizers of other construction, e.g. a cylindrical nodulizer, may also be used, or the shaped particles may be produced by briquetting in carrying out the invention.

In order to retain any occasional oversize, a slotted sieve can be attached to the rim of the dish, which will retain and gradually break down any nodules which grow to oversize dimensions.

The pre-shaped or nodulized material is fed to a conveyor 3 which takes it to a vertical shaft furnace 4, hereinafter referred to as a sintering furnace. Preferably, the sintering furnace is fed through a rotating distributor 5 at the top and has a means 6 for precise temperature control, an automatic discharge grate 7 at the bottom and a suitable air-lockgate system 8 for the material discharge in order to prevent air blast supplied to the bottom of the furnace from escaping by this route.

The air inlet is shown at 9 and the flue gas outlet at 10. The nodules fed at the top of the sintering furnace pass in succession through a preheating zone, a combustion zone, a sintering zone which overlaps in part with the lower portion of the combustion zone, and the sintered material passes from the sintering zone to a cooling zone which extends to the bottom of the sintering furnace.

The purpose of the rotating distributor 5 is to provide preferential arrangement in the bed of the furnace to improve the contour and stability of the sintering zone. The grate 7 has the additional function of breaking down any cakes of material which may be formed in the sintering furnace.

After processing, the material is discharged and any oversize lumps are crushed, if necessary, to the limiting maximum size required and the whole may then be screened and graded.

The temperature control of the sintering furnace is shown as obtained by using excess air for the removal of any undesired heat content and to stabilize at the same time the pre-heat zone by suitable means, such as the means shown at 6 for taking off part of the heated gases at an intermediate level in the furnace, in the manner described for example in my Patent No. 2,654,589, issued October 6, 1953. This means makes available, in an easily applicable form, the heat content of any excess fuel in the material and thus adds to the improvement of economy.

As examples of other temperature control means which may be used in carrying out the invention, the following are mentioned:

(a) Variation of the water content in the feed so as to absorb the excess heat generated by the fuel;

(b) Returning a controlled proportion of the already treated material from the screening plant into the feed in order to reduce the ratio of the fuel content to the total feed;

(c) Addition of a water spray or steam to the air blast entering the sintering furnace;

(d) Addition of inert gases and/or the gases which are the products of combustion, to the blast air entering the sintering furnace;

(e) If the fuel content of the starting material is too low, for instance less than about 3%, addition of fuel material such as sawdust and/or locomotive cinders to the starting materials in order to supply the necessary heat and simultaneously increase the porosity of the finished product, which is a desirable feature.

These various temperature control means may be combined in any desired manner.

*Example*

Fly ash containing 4–5% of unburnt carbon, which has been derived from a furnace fired with pulverized coal and abstracted for instance by electrostatic precipitation, is fed in dust form to a table nodulizer inclined at about 30° at a rate of approximately 10 tons per hour. About 2 tons of water are added to the dust material fed to the nodulizer, and nodules of approximately ⅜ of an inch in diameter are formed. If desired, any iron particles contained in the fly ash may be removed, before it is fed to the nodulizer.

The fly ash, excluding its carbon content, may be approximately of the following composition:

| | Percent |
|---|---|
| $SiO_2$ | 55.5 |
| $Al_2O_3$ | 22.6 |
| $Fe_2O_3$ | 12.55 |
| $TiO_2$ | 1.0 |
| $P_2O_5$ | 0.05 |
| CaO | 2.1 |
| MgO | 1.3 |
| $Na_2O$ | 0.5 |
| $K_2O$ | 2.5 |
| $SO_3$ | 1.9 |

The sintering furnace may have an overall height of 40 feet or about 30 feet for the furnace space and a diameter of about 8½ feet. The nodules are fed continuously into the sintering furnace and an air blast of approximately 6000 cubic feet is supplied to the bottom of the sintering furnace per minute at a pressure of approximately 60 inches water gauge.

The material passes in succession through the preheating zone which has a height of 3–6 feet, the combustion and sintering zone, which usually do not extend below the upper third of the length of the furnace space and together may have an approximate depth of about 5–8 feet, and the sintered material then passes through the cooling zone, and is finally removed at the bottom of the sintering furnace.

The proportion of heat withdrawn in the neighbourhood or at the combustion zone of the sintering furnace to the heat used for pre-heating the material in the upper part of the furnace is adjusted so as to maintain the temperature of combustion in the overlapping portions of the combustion and sintering zones, at approximately 1200° C., plus or minus 50° C. which has been established by preliminary tests to be the temperature at which sintering occurs in the particular fly ash used in this example. Care is taken to see that this temperature does not rise above the melting point of the material, and does not fall below the lower limit for sintering. If the nodules fed into the sintering furnace have a carbon content of about 5–7%, then the amount of blast removed in the form of hot gases near the combustion zone is about 50% of the total amount of blast supplied. It is smaller with lower carbon content of the feed.

The sintered material withdrawn from the bottom of the sintering furnace is screened and graded ready for storage and distribution.

In proceeding in the above described manner the starting material enters the sintering furnace with a substantially uniform particle size. This is of advantage because it results in maximum bed porosity which in turn is essential in that the porosity controls the through-put which can be obtained from a given size of the furnace, the rate of feeding being proportional to the rate of gas flow through the bed.

The maintenance of the close temperature control in the sintering furnace is necessary in order to obtain an end product which has favourable characteristics for use as a light weight concrete aggregate or as a filter or heat insulation material. The control of the furnace temperature is achieved in the above described manner and the control means and procedures described in my U.S. Patent No. 2,654,589 are those presently preferred for this purpose.

In carrying out the present invention, the lower part of the furnace serves as a heat exchanger or cooling zone and the sensible heat of the material treated is used to preheat the air and/or vapors used.

The particles of the sintered product obtained according to the present invention are of substantially nodular shape and the size of the nodules is substantially uniform. This lightweight aggregate is generally used with the addition of cement to form the concrete and it has been found that the most desirable shape for the aggregate is that of spherical particles of uniform size. In carrying out the invention, a substantial proportion of the end product is obtained, as a rule, directly in nodular form without the necessity of additional steps, such as grading.

The product of the invention consists of substantially homogeneous particles as the result of the closely controlled uniform heating according to the invention and the treatment of the starting material in the preformed nodulized form as described above.

Various modifications may be made within the scope of the invention. For example, instead of using one large vertical shaft furnace, a battery of small vertical chambers arranged to work in succession can be used as described in my U.S. Patent No. 2,654,588, issued October 6, 1953, and the expression "vertical type shaft furnace" as used in some of the claims is intended to cover a vertical shaft furnace as illustrated and likewise arrangements with a battery of small vertical chambers as illustrated in said patent. Furthermore, the sintering furnace, whether consisting of a single vertical shaft furnace or a plurality of small chambers as described in said U.S. Patent, can be operated with oxidising or reducing atmosphere, the latter resulting in the formation of a non-porous coating on the sintered nodules. A reducing atmosphere will be present in the sintering furnace if, for example, the amount of oxygen introduced into the furnace is insufficient for producing completely oxidized combustion products so that incompletely oxidized products, e.g. CO, are present in the furnace, and the offtake gases are in the form of a gaseous fuel.

While specific values have been given above, it should be understood that they are given by way of example. While fly ash is presently the most important starting product in the use of my invention, other powdered material containing solid fuel corresponding to a carbon content of less than 50% may be advantageously treated in the manner described.

Reference is made to my co-pending application (now abandoned) Serial No. 497,625, filed March 29, 1955, in Division 3 for "Utilization of Fly Ash," of which this is a continuation-in-part.

What is claimed is:

1. A process for producing sintered material from fly ash corresponding to a carbon content of at least 2.5% on a dry basis, whereby the fly ash is first nodulized into particles of substantially uniform shape and dimensions, comprising the steps of causing said particles to pass downward and in succession through vertically extending combustion and sintering zones and a cooling zone, at a substantially constant sintering temperature in the range between 1150° and 1250° C. in counter-current to an ascending air blast, in order to cause burning of the fuel and sintering of said particles during passage thereof through said zones and subsequently removing the sintered particles from said cooling zone.

2. A process as claimed in claim 1, in which the shaped starting material has a fuel content equal to a carbon content of less than 50% by weight, on dry basis.

3. A process as claimed in claim 1, in which the process is carried out in a vertical type shaft furnace.

4. A process as claimed in claim 3, in which the temperature of the sintering zone is maintained at a predetermined value by supplying air in excess of the amount needed for combustion, at the bottom of the furnace and removing excess heat from the furnace by removing part of the combustion gases and air at an intermediate level of the furnace.

5. A process as claimed in claim 3, in which the temperature of the sintering zone is maintained substantially constant at a predetermined value, at least in part, by adjustment of the heat capacity of the blast supplied per unit quantity of the material treated.

6. A process for producing sintered material from fly ash containing fuel corresponding to a carbon content of at least 2.5% by weight on dry basis and adapted for continuous operation comprising the steps of first forming the fly ash to shaped particles of substantially uniform size, causing said particles to pass downward and in succession through a pre-heating zone, combustion and sintering zones and a cooling zone of a vertical type shaft furnace, in countercurrent to an ascending air blast supplied at the bottom of said furnace, while maintaining the temperature of said sintering zone substantially constant at a value above the softening point and below the melting point of said fly ash, in order to cause burning of the fuel and individual sintering of the particles during their passage through said sintering zone, and finally removing the sintered particles from the bottom of said furnace after their passage through said cooling zone.

7. A process as claimed in claim 1, in which the process is carried out in a reducing atmosphere in order to impart a non-porous coating to the shaped sintered products.

References Cited in the file of this patent

UNITED STATES PATENTS

| | | |
|---|---|---|
| 1,239,221 | Rodman | Sept. 4, 1917 |
| 2,414,734 | Gelbman | Jan. 21, 1947 |
| 2,436,766 | Davis | Feb. 24, 1948 |
| 2,436,771 | Hood | Feb. 24, 1948 |
| 2,544,752 | Gelbman | Mar. 13, 1951 |
| 2,654,589 | Somogyi | Oct. 6, 1953 |
| 2,769,719 | De Vaney | Nov. 6, 1956 |

FOREIGN PATENTS

| | | |
|---|---|---|
| 238,340 | Great Britain | Aug. 20, 1925 |

UNITED STATES PATENT OFFICE

CERTIFICATE OF CORRECTION

Patent No. 2,933,796            April 26, 1960

Francis Paul Somogyi

It is hereby certified that error appears in the above numbered patent requiring correction and that the said Letters Patent should read as corrected below.

In the heading to the printed specification, line 5, for "Netherlands May 9, 1956" read -- Great Britain April 9, 1954 --.

Signed and sealed this 4th day of October 1960.

(SEAL)

Attest:

KARL H. AXLINE

Attesting Officer

ROBERT C. WATSON
Commissioner of Patents